United States Patent

[11] 3,556,123

| | | |
|---|---|---|
| [72] | Inventor | Roy B. Smith<br>Washington Court House, Ohio |
| [21] | Appl. No. | 781,919 |
| [22] | Filed | Dec. 6, 1968 |
| [45] | Patented | Jan. 19, 1971 |
| [73] | Assignee | Transportation Specialists, Inc.<br>Columbus, Ohio<br>a corporation of Ohio |

[54] INTERNAL SYSTEM RELIEF VALVE
18 Claims, 7 Drawing Figs.

[52] U.S. Cl. .................................................. 137/107, 184/7
[51] Int. Cl. ................................................ G05d 11/00
[50] Field of Search ........................................ 137/102, 107; 184/7C-1; 91/442

[56] References Cited
UNITED STATES PATENTS
2,612,237   9/1952   Tear .............................. 184/7
2,643,739   6/1953   Tear .............................. 184/7

Primary Examiner—Carroll B. Dority, Jr.
Attorney—Jerome R. Cox

ABSTRACT: A valve, comprising passageways drilled in a solid body and moving parts therein, is disclosed for use in relieving the pressure in a lubrication system after lubricant has been forced into the system under pressure. The valve has a central hole through it formed by a bore and an oppositely directed counter bore which intersect to make a shoulder. A disc is positioned at the shoulder to function as a check valve. A piston pump is connected to the counterbore. A passageway having a check valve connects the counterbore with the lubrication distribution system for supplying lubricant to the system. A return and relief passageway is provided between the distribution system and the bore, which bore is connected to a lubricant reservoir. A cylinder containing a piston is connected to the system by suitable passageways. The piston is pressure-actuated and is connected to a blocking means which blocks the return and relief passageways when lubricant is supplied into the distribution system under pressure but permits return of excess lubricant to the reservoir through the return passageways, after pump pressures cease. The residual pressure in the system causes this excess lubricant to be exhausted from the system and returned to the reservoir.

PATENTED JAN 19 1971

INVENTOR.
ROY B. SMITH
BY
Jerome R. Cox
ATTORNEY

FIG 4
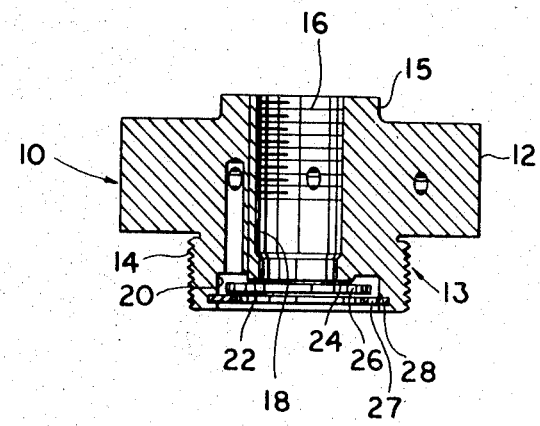
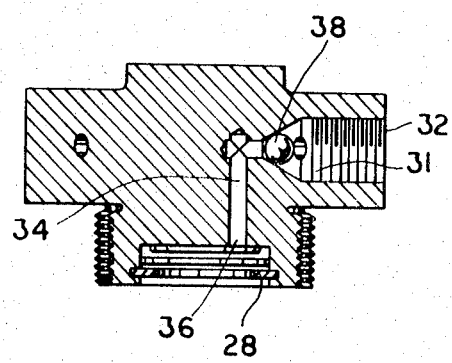
FIG 5

INVENTOR.
ROY B. SMITH
BY
Jerome R. Cox
ATTORNEY 3,556,123

INTERNAL SYSTEM RELIEF VALVE

BACKGROUND OF THE INVENTION

This invention relates to a device for relieving a fluid system of residual pressure and more particularly relates to a valve permitting the withdrawal of lubricant from a supply reservoir, for permitting the supply of lubricant into a lubrication distribution system during the application of a pump pressure, and for subsequently permitting relief of the residual pressure in the system after pump pressure ceases.

In many mechanical machines, it is necessary to provide the machine with its own integral lubrication system. Such a lubrication system comprises a pump, a reservoir of lubricant, such as grease, and a distribution system perhaps having several branch conduits leading to the interfacing surfaces which require periodic lubrication.

Typically the pump is periodically operated to force the necessary quantity of grease along the distribution system and into the bearings, etc. to be lubricated. The pump then remains inactive or passive until it is time to repeat the lubrication.

It is obviously necessary to have a check valve in the passageway between the pump and the distribution system to permit the pump to force lubricant into the system on its pressure stroke but to prevent the pump from withdrawing lubricant from the system during its vacuum stroke. However, this check valve also prevents the escape of excess lubricant from the distribution system and prevents relief of the residual pressure in the distribution system after the pressure stroke ends.

Thus, if only a single check valve is provided, the distribution system will remain pressurized after the pressure stroke of the pump has ended. There is a need for a valve which will properly relieve the pressure yet provide for withdrawal of lubricant from a reservoir and for supply of lubricant to a lubrication system.

It is therefore an object of my invention to provide an improved system relief valve.

A further object of my invention is to provide a valve having no external control connections but which is actuated solely from periodic pressure changes.

Further objects and features of my invention will be apparent from the following specification and claims when considered in connection with the accompanying drawings illustrating several embodiments of my invention.

SUMMARY OF THE INVENTION

I have found that the foregoing and other objects may be attained in a valve, for use with a pump, a reservoir for storing and supplying a fluid, and a fluid distribution system, the valve comprising: (a) pump connection means for fluid connection of the valve to a pump; (b) system connection means for fluid connection of the valve to a fluid distribution system; (c) reservoir connection means for fluid connection of the valve to a source of fluid; (d) a first passageway means communicating with the system connection means and the pump connection means; (e) a first check valve interposed in the first passageway means for permitting fluid flow toward the system connection means; (f) a second passageway means communicating with the reservoir connection means and the pump connection means; (g) a second check valve interposed in the second passageway means for permitting fluid flow toward the pump connection means; (h) a third passageway means communicating with the system connection means and the reservoir connection means; (i) a blocking means interposed in the third passageway means; (j) means for actuating the blocking means into a position for blocking fluid flow through the third passageway means in response to pressure from the pump and for permitting pressure from the system to open the controlled valve in the absence of pump pressure.

DESCRIPTION OF THE VIEWS

FIG. 4 is a view in vertical section taken substantially along the line 4-4 of FIG. 6;

FIG. 5 is a view in vertical section taken substantially along the line 5-5 of FIG. 6;

Figure 1:
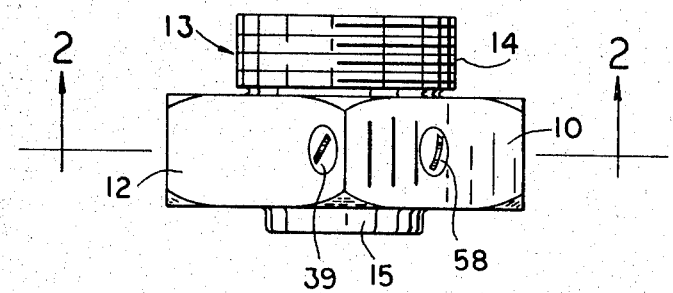
FIG. 1 is a rear view in side elevation of an embodiment of my invention as illustrated in FIG. 2.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

DETAILED DESCRIPTION

In FIGS. 1, 2, 3, 4, 5 and 6, I illustrate the preferred embodiment of my invention and will refer to these six figures simultaneously to describe this embodiment.

I prefer to construct my valve as a single body 10. The body 10 has a hexagonal midsection 12, a pump end 13 formed with external threads 14, and a slightly smaller reservoir end 15 which is formed with internal threads as at 16. A passageway extends through the body and consists of a smaller bore 18 and an oppositely directed larger counterbore 20. It should be noted that although the bore 18 has a threaded portion and, as shown, itself has a counterbore so that it has various diameters, nonetheless I refer to the whole portion of the vertical passageway down to the counterbore 20 as the bore 18.

Figure 3:
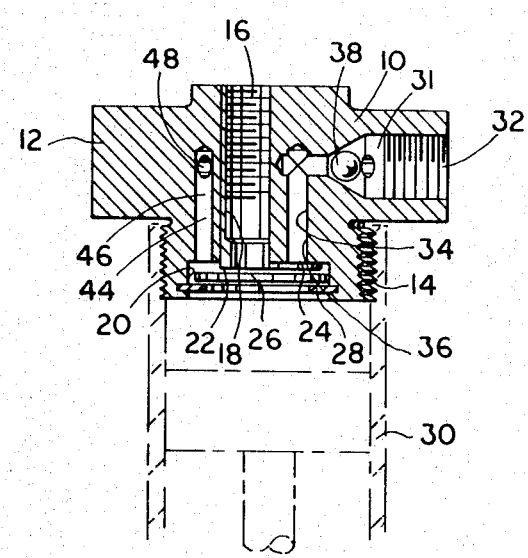
FIG. 3 is a front view in vertical section of the embodiment of my invention illustrated in FIG. 2 taken substantially along the line 3-3 of FIG. 2.
Figure 6:
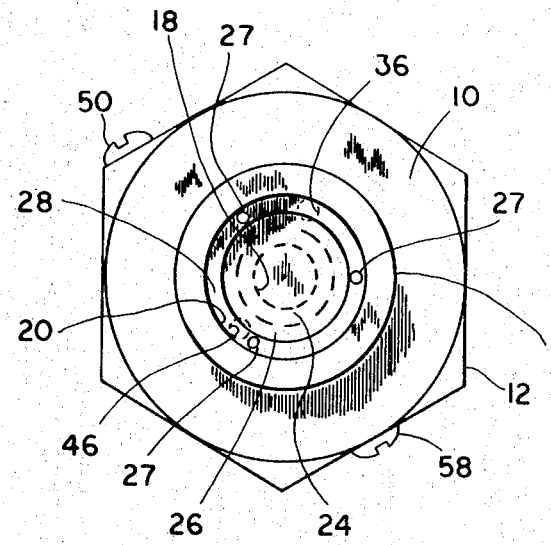
FIG. 6 is a bottom view of the embodiment of my invention illustrated in FIGS. 1, 2, 3, and 4.

I provide means to draw fluids such as grease, oil, or other lubricant from the reservoir (which is connected to the bore 18 at the threads 16) through the bore 18 and through the counterbore 20 toward or into a pump 30 which is shown in dotted lines in FIG. 3 and is shown connected to the valve by the threads 14.

I also provide means whereby this lubricant is drawn into or toward the pump 30 on the suction stroke of the pump but cannot return to the reservoir on the pressure stroke of the pump. This means comprises a check valve consisting of a circular disc 26 positioned in the counterbore 20. The bore 18 and the counterbore 20 intersect to form a shoulder 22. An annular boss 24 extends from the shoulder 22 around the bore 18. The circular disc 26 is designed to seat upon the boss 24 during the pressure stroke of the pump 30 but to seat upon a retaining ring 28 during the suction stroke of the pump. The retaining ring is provided with holes 27 (FIGS. 4 and 5). Thus the disc 26 is sealingly pressed against the boss 24 on the pump pressure stroke to prevent passage of fluid from the counterbore 20 to the bore 18. However, on the pump's vacuum stroke, fluid may be drawn from a reservoir connected to the bore 18 by threads 16, into the bore 18, past the disc 26, through the holes 27 in the retaining ring, and into the counterbore 20, and into or toward the pump 30.

I further provide means whereby liquid drawn into or toward the pump 30 on the suction stroke may, on the pressure stroke, be forced to and through an outlet of the valve and to devices such as, for example, bearings where it is desired to distribute the liquid. During the pressure stroke of the pump 30, fluid may be forced around the edge of the disc 26, between the disc 26 and the shoulder 22 and into an inlet opening 36 (FIG. 4) of an outlet passage 34 which is provided in the body 10. A ball check valve, which may be designated a first check valve, is interposed in the outlet passage 34 and has a ball 38. The ball 38 permits fluid flow during the pump pressure stroke from the counterbore 20 through the outlet passage 34 and out of a threaded outlet port 32. The ball 38 prevents flow in the opposite direction along the same path.

I still further provide means whereby fluid such as lubricants trapped under pressure in the distributional system or the outlet passageway 31 leading to the outlet port 32, may be released after the pressure of the pump ceases and after the lubricant has accomplished the purpose desired, as for example, that of lubricating a bearing. For this purpose, I provide a drilled return passageway 52 (FIG. 2) connected to the outlet passageway 31 and leading to a cylinder 40, and from the cylinder 40 through a drilled relief passageway 54 back to the bore 18 whence the lubricant may escape back to the reservoir. A bore 56 is suitably drilled, tapped and plugged by a screw 58 to form the relief passageway 54. The cylinder 40 is provided with a differential piston 60 which is designed to block the return passageway 52 when pressure from the pump, acting on its pressure stroke, is applied to the piston 60. The piston 60 is provided with a head 61 which has a sealing O-ring 62 and which fits snugly in the cylinder 40. The piston 60 is also provided with a plunger 64 of smaller diameter attached at the forward end of the piston 60. The plunger 64 has a tapered end 66 adapted to cooperate with the tapered valve seat 68 formed at the end of the cylinder 40 leading to the passageway 52. Lubricant, or other fluid under pressure, is supplied to the cylinder 50 to bear upon the head 61 of the piston 60 when the pump is exerting its pressure stroke. To this end, I provide a pressure-sensing passageway 44 consisting of two intersecting bores 46 and 48. This passageway is suitably formed to communicate with the counterbore 20 and with a first end 41 of the cylinder 40. The pressure-sensing passageway is formed by drilling a hole 46 in the shoulder 22 next to but not through the boss 24 and by drilling a second hole 48 into the edge of the midsection 12 so that it intersects the first hole 46 and the cylinder 40 at the first end of the cylinder 40. The bore 48 is suitably tapped at the exterior of the body 10 and plugged by a screw 50.

Figure 2:
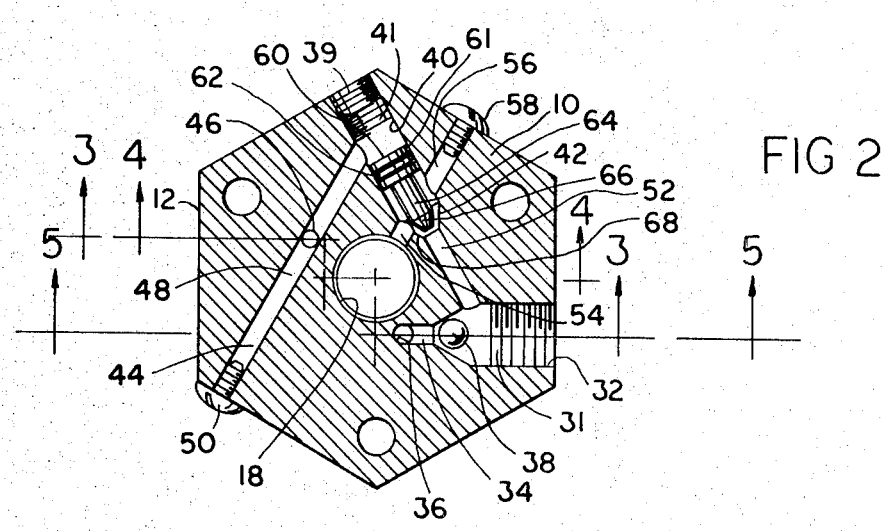
FIG. 2 is a view in horizontal section of the preferred embodiment of my invention taken substantially along the line 2-2 of FIG. 1.

On the pump pressure stroke, pressure is exerted on the head 61 of the piston 60 through the pressure-sensing passageway 44. Inasmuch as the annular space surrounding the plunger 64 is vented through the passageway 54, the pressure exerted on the head 61 tends to move the piston 60 downward to the right as shown in FIG. 2. During the pump pressure stroke, the pressure in the passageway 52 tends to build up to that exerted by the pump. However, so long as the plunger 62 is not seated in the valve seat 68, the annular space surrounding the plunger 64 (being vented through the passageway 54) and the passageway 52 connected thereto are at a lower pressure than the pump pressure. The piston 60 thus is moved quickly to cause the tapered end 66 of the plunger 64 to seat in the valve seat 68 and prevent the escape of fluid from the passageway 52 into the annular space surrounding the plunger 64 and through passageway 54 to the bore 18. The pressure in the passageway 52 then quickly builds up to the pump pressure to force fluid to the distribution system. At such time (with tapered end 66 of the plunger 64 seated), the piston 60 becomes a differential piston in which the same fluid pressure is acting on both ends, but in which, on account of the larger area of the head 61 as compared with the smaller area of the end 66 of the plunger 64, the greater force is acting to hold the plunger seated so long as pump pressure is applied. However, when pump pressure is relieved in the pressure-sensing passageway 44, and if fluid under higher pressure is trapped in the passageway 52, and in the distribution system connected thereto, the piston 60 is moved in the opposite direction to relieve the excess pressure in the passageway 52.

In another sense, the tapered end 66 of the plunger 64 cooperates with the seat 68 to form a valve which is controlled by the piston 60 to move to a closed position when pump pressure is built up but moves to an open position when the pump pressure is released. Other types of pressure-controlled valves could be used if desired. By this arrangement, the plunger 64 prevents fluid flow during the pressure stroke of the pump from the outlet passage 34 along the return passageway 52 and out the relief passageway 54 into the bore 18. At the same time, the ball check valve 38 prevents passage of fluid from the outlet 32, the passageway 31, back to the passageway 34. It will be observed that the relief passageway 54 is designed, except during the pressure stroke, to relieve pressure from the cylinder 40 which might otherwise be trapped in the system ahead of the piston 60. Thus, when the pump is not on its pressure stroke, as for example at rest or on its suction stroke, pressure in the passageway 52 acting on the plunger 62 moves the plunger from its seat 68 and allows escape of liquid from the outlet 32, the passageway 31, the passageway 52, and into the bore 18.

OPERATION OF THE PREFERRED EMBODIMENT

In operation, the preferred embodiment illustrated in FIGS. 1—6 has its externally threaded end with threads 14 in fluid connection to a pump 30. The internal threads 16 of the bore 18 maintain the bore 18 in fluid communication with a reservoir (not shown). The outlet port 32 is threadedly engaged in fluid communication with a distribution system (also not illustrated). Usually this distribution system comprises a conduit network for carrying lubricant to the interfacing surfaces which must be lubricated. However, my invention could be connected directly to a single bearing surface to be supplied with lubricant.

On the pump vacuum stroke, lubricating fluid, such as oil or grease, is withdrawn from the reservoir through the bore 18 and the counterbore 20 toward or into the pump 30. The disc 26 moves away from the boss 24 and against the retaining ring 28 to permit such a flow. On the pressure stroke, the disc 26 is pressed against the boss 24 to prevent flow in the reverse direction along the above path into the reservoir. Pressure is applied on the piston 60 through the pressure sensing passageway 44 to move the plunger against the valve seat 68 and block flow through the return passageway 52. Fluid flows through the outlet passageway 34, past the ball 38, out the outlet port 32 and into the distribution system.

The pressure stroke is then ended and the pump becomes passive. The residual pressure in the distribution system forces the ball 38 against its seat to prevent a return of fluid from the system into the pump. The same residual pressure in the system pushes the piston 60 away from the second end 42 of the cylinder 40 taking the plunger 64 with it. This permits the fluid in the system to exhaust into the reservoir until the system loses its residual pressure. The fluid will exhaust through the outlet port 32, the return passageway 52, the cylinder 40, the relief passageway 54, and the bore 18.

GENERALIZED EMBODIMENT

Figure 7:
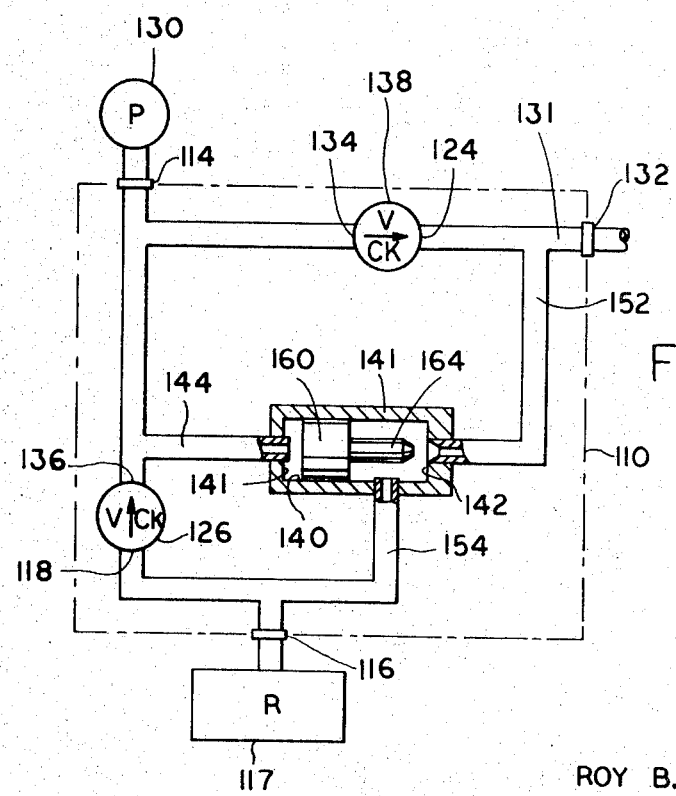
FIG. 7 is a diagrammatic view of generalized embodiment of my invention.

In FIG. 7, I illustrate a generalized schematic of an embodiment of my invention.

Elements of my valve are contained within the broken line 110 and are connected to a pump 130 and a reservoir 117. The valve is provided with a pump connection means 114 such as a threaded hole or male connector. The inlet end 134 of a first check valve 138 is connected in fluid communication with the pump connection means 114. This fluid communication, like most of the fluid communication previously described, can be by means of passageways drilled in a solid body. Alternatively, this fluid communication could be provided by fluid conduits connecting discreet components. I shall use the term "passageway means" to indicate structure which provides fluid communication between two or more component parts of my valve.

The valve is also provided with a system connection means 132 which can be any one of several well-known alternative fluid connectors. The system connection means is connected in fluid communication with the outlet 124 of the first check valve 138 by a suitable passageway means 131.

A second check valve 126 is provided with suitable passageway means to connect its outlet 136 in fluid communication with the pump connection means 114. A reservoir connection means 116 is provided and is connected in fluid communication with the inlet 118 of the second check valve 126 by suitable passageway means.

The valve also has a body 141 with a bore in it functioning as a cylinder 140. The cylinder is sealed, in that it is completely enclosed except for certain openings to be described. A piston 160 is slidably fitted within the cylinder 140 and sealingly engaged to its walls. I illustrate a plunger 164 and cooperating valve seat like those described in the preferred embodiment. It should be understood that there are various alternative fluid-blocking means which could be used to prevent flow of fluid from the fist check valve into the cylinder. For example, a flexible diaphragm could be used instead of a piston and could flex to cover and uncover an opening in response to pressure. Such a diaphragm would be equivalent to a piston for purposes of my invention. As another example, the plunger could be eliminated and the piston could move to a position for itself blocking fluid flow from the proper opening.

A passageway means comprising passageway 144 provides fluid communication between the pump connection means 114 and a first end 141 of the cylinder 140. Suitable passageway means, comprising passageway 154, connects the second end 142 of the cylinder 140 to the reservoir connection means 116. Another passageway means comprising passageway 152 provides fluid communication between the system connection means 132 and the second end 142 of the cylinder 140.

In the operation of this generalized embodiment, a pump 130 vacuum draws fluid out of the reservoir 117 through the second check valve 126 and toward the pump 130. Pump pressure moves the fluid through the first check valve 138 and simultaneously actuates the blocking means, such as plunger 164, into its blocking position. Pump relaxation or passivity permits the residual system pressure to move the blocking means to the unblocking position and to exhaust excess fluid into the reservoir 117.

It should be understood that it would be possible that the pump could have its own source of fluid apart from the reservoir. It, for example, could be like a grease gun in that it would emit a small portion of its contents during a short pressure stroke. In this case, the reservoir would be merely a collection receptacle. With such a modification, the second check valve 126 could be omitted and the passageways leading to it could be permanently blocked or nonexistent since the pump would not draw its supply from the reservoir.

It is to be understood that while the detailed drawings and specific examples given describe preferred embodiments of my invention, they are for the purposes of illustration only, that the apparatus of the invention is not limited to the precise details and conditions disclosed, and that various changes may be made therein without departing from the spirit of the invention which is defined by the following claims.

I claim:

1. A valve, for use with a pump, a reservoir for storing and supplying a fluid and a fluid distribution system, the valve comprising:
  a. pump connection means for fluid connection of the valve to a pump;
  b. system connection means for fluid connection of the valve to a fluid distribution system;
  c. reservoir connection means for fluid connection of the valve to a source of fluid;
  d. a first passageway means communicating with the system connection means and the pump connection means;
  e. a second passageway means communicating with the reservoir connection means and the pump connection means;
  f. a first check valve interposed in the first passageway means for permitting fluid flow toward the system connection means;
  g. a second check valve interposed in the second passageway means for permitting fluid flow toward the pump connection means;
  h. a third passageway means communicating with the system connection means and the reservoir connection means;
  i. a blocking means interposed in the third passageway means for at times blocking flow therethrough; and
  j. means for actuating the blocking means into a position for blocking fluid flow through the third passageway means in response to pressure from the pump and for permitting pressure from the system in the absence of pump pressure to move the blocking means to an unblocking position.

2. A valve according to claim 1, wherein the means for actuating the blocking means comprises a differential piston.

3. A valve according to claim 2, wherein the differential piston has a relatively large head subject to pressure developed by the pump and a relatively small head subject to pressure developed in the fluid distribution system.

4. A valve according to claim 2, wherein the differential piston has a relatively large head subject to pressure developed by the pump and a relatively small head subject to pressure developed in the fluid distribution system.

5. A valve for use with a pump, a reservoir for storing and supplying a fluid distribution system, the valve comprising:
  a. pump connection means for fluid connection of the valve to the pump;
  b. a first check valve;
  c. a passageway means for conducting fluid between the pump connection means and the inlet of the first check valve;
  d. system connection means for fluid connection of the valve to the distribution system;
  e. passageway means for conducting fluid between the outlet of the first check valve and the system connection means;
  f. a second check valve;
  g. passageway means for conducting fluid between the outlet of the second check valve and the pump connection means;
  h. reservoir connection means for fluid connection of the valve to the reservoir;
  i. passageway means for conducting fluid between the reservoir connection means and the inlet of the second check valve;
  j. a body having a sealed bore therein functioning as a cylinder;
  k. a piston slidable within the cylinder and sealingly engaged to its wall;
  l. passageway means for providing fluid communication between the pump connection means and the cylinder at a first end of the piston;
  m. passageway means for conducting fluid between the system connection means and the cylinder at the second end of the piston;
  n. fluid-blocking means for preventing flow of fluid out of the first check valve and into the cylinder, said blocking means actuated into blocking position by a sufficient pressure on said first end of the piston; and
  o. passageway means for conducting fluid from the cylinder at the second end of the piston to the reservoir connection means wherein a pump vacuum draws fluid out of the reservoir through the second check valve and toward the pump, pump pressure forces the fluid through the first check valve and simultaneously actuates the blocking means into blocking position, and pump relaxation permits residual system pressure to move the blocking means to the unblocking position and to exhaust excess fluid into the reservoir.

6. A valve according to claim 5, wherein all of said passageway means comprise a plurality of passageways formed in said body.

7. A valve according to claim 5, wherein the blocking means comprises:
  a. a plunger fixed to the second end of the piston and having a tapered end; and b. a valve seat into which said tapered end is seatable, the valve seat being positioned at the intersection of said sealed bore and said passageway means for conducting fluid between the system connection means and the bore.

8. A valve, for use with a pump, a reservoir for storing and supplying a lubricant, and a lubricant distribution system, the valve comprising:
 a. a body having
  1. a bore;
  2. an oppositely directed counterbore intersecting said bore within the body, the bore and counterbore forming a hole through the body;
  3. a system outlet port in the body;
  4. an outlet passageway communicating with said outlet port and with said counterbore;
  5. a void in said body forming a cylinder;
  6. a pressure-sensing passageway communicating with the counterbore and with the cylinder near a first end of the cylinder;
  7. a return passageway communicating with the system outlet port and the second end of the cylinder;
  8. a relief passageway communicating with the bore and with the second end of the cylinder;
 b. a first check valve interposed in said outlet passageway for permitting fluid flow in the outlet passageway only toward the outlet port;
 c. a second check valve interposed between the bore and the counterbore to prevent fluid flow from the counterbore to the bore;
 d. a piston in said cylinder interposed between said ends of the cylinder; and
 e. fluid-blocking means for being actuated into a blocking position by movement of the piston toward the second end of the cylinder and thereby for preventing fluid flow from the return passageway to the relief passageway wherein the pump may be connected in fluid communication with the counterbore and the reservoir may be connected in fluid communication with the bore.

9. A valve according to claim 8, wherein:
 a. the body has a shoulder formed at the intersection of the bore and the counterbore;
 b. the second check valve comprises:
  1. an annular boss on the shoulder surrounding the bore;
  2. a disc juxtaposed to the boss and seatable against the boss for blocking passage of lubricant between the counterbore and the bore;
  3. retaining means for retaining the disc near the boss wherein the exertion of a pressure by the pump causes the disc to seat against the boss.

10. A valve according to claim 8, wherein the pressure sensing passageway and the outlet passageway each communicate with the counterbore at said shoulder but not at said boss.

11. A valve according to claim 8, wherein the fluid blocking means comprises:
 a. a plunger attached to the piston and provided with a tapered end for acting as a valve; and
 b. a valve seat at the intersection of the cylinder and the return passageway, the valve seat being tapered and positioned to sealingly receive the tapered end of the plunger when sufficient pressure is applied to the piston through the pressure sensing passageway.

12. A valve according to claim 8, wherein the first check valve comprises a ball check valve.

13. A valve according to claim 8 wherein:
 a. internal threads are provided in said bore; and
 b. external threads are provided around said counterbore.

14. A valve according to claim 8, wherein the body has a midsection having a polygonal cross section for cooperation with a wrench.

15. A valve according to claim 14, wherein the midsection has a regular hexagonal cross section.

16. A valve according to claim 9, wherein:
 a. The fluid-blocking means comprises:
  1. a plunger attached to the piston and provided with a tapered end for acting as a valve;
  2. a valve seat at the intersection of the cylinder and the return passageway, the valve seat being tapered and positioned to sealingly receive the tapered end of the plunger when sufficient pressure is applied to the piston through the pressure-sensing passageway;
 b. the pressure-sensing passageway and the outlet passageway each communicate with the counterbore at said shoulder but not at said boss;
 c. the first check valve is a ball check valve;
 d. internal threads are provided on said bore;
 e. external threads are provided around said counterbore; and
 f. the body has a midsection having a regular hexagonal cross section.

17. A valve according to claim 9, wherein
 a. the fluid-blocking means comprises;
  1. a relatively large head for said piston;
  2. a plunger attached to the piston and provided with a tapered end for acting as a valve, and having a diameter appreciably less than the diameter of the piston head;
  3. a valve seat at the intersection of the cylinder and the return passageway, the valve seat being tapered and positioned to sealingly receive the tapered end of the plunger when sufficient pressure is applied to the piston through the pressure-sensing passageway:
 b. the pressure-sensing passageway and the outlet passageway each communicate with the counterbore at said shoulder but not at said boss;
 c. the first check valve is a ball check valve;
 d. internal threads are provided on said bore;
 e. external threads are provided around said counterbore; and
 f. the body has a midsection having a regular hexagonal cross section.

18. A valve for use with a pump, a reservoir for storing and supplying a fluid distribution system, the valve comprising:
 a. pump connection means for fluid connection of the valve to the pump;
 b. a first check valve;
 c. passageway means for conducting fluid between the pump connection means and the inlet of the first check valve;
 d. system connection means for fluid connection of the valve to the distribution system;
 e. passageway means for conducting fluid between the outlet of the first check valve and the system connection means;
 f. a second check valve;
 g. passageway means for conducting fluid between the outlet of the second check valve and the pump connection means;
 h. reservoir connection means for fluid connection of the valve to the reservoir;
 i. passageway means for conducting fluid between the reservoir connection means and the inlet of the second check valve;
 j. a body having a sealed bore therein functioning as a cylinder;
 k. a piston slidable within the cylinder sealingly engaged to its wall, having a relatively large head, and having a plunger of appreciably smaller area than said head;
 l. passageway means for providing fluid communication between the pump connection means and the cylinder at a first end of the piston;
 m. passageway means for conduction fluid between the system connection means and the cylinder at the second end of the piston;
 n. fluid-blocking means for preventing flow of fluid out of the first check valve and into the cylinder, said blocking means including said plunger which is actuated into blocking position by a sufficient pressure on said relatively large head of the piston; and o. passageway means for conducting fluid from the cylinder at the second end of the piston to the reservoir connection means wherein a pump vacuum draws fluid out of the reservoir through the second check valve and toward the pump, pump pressure forces the fluid through the first check valve and simultaneously because of the differential piston actuates the blocking means into blocking position, and pump relaxation permits residual system pressure to move the blocking means to the unblocking position and to exhaust excess fluid into the reservoir.

PO-1050
(5/69)

UNITED STATES PATENT OFFICE
CERTIFICATE OF CORRECTION

Patent No. 3556123                    Dated January 19, 1971

Inventor(s)         Roy B. Smith

It is certified that error appears in the above-identified patent and that said Letters Patent are hereby corrected as shown below:

Column 2, line 13 should read --- of a generalized ---;

Column 5, line 12 should read --- from the first check valve ---;

Column 6, line 17 (line 1 of claim 4) should read: --- A valve according to claim _3_ ---

(due to this error, claims 3 and 4 appear to be duplicates and both dependent on claim 2, but claim 4 should properly be dependent on claim 3).

Signed and sealed this 11th day of May 1971.

(SEAL)
Attest:

EDWARD M. FLETCHER, JR.                WILLIAM E. SCHUYLER, J
Attesting Officer                      Commissioner of Patent